(No Model.) 6 Sheets—Sheet 2.
T. TANNER & E. LUTZ.
SHIP'S COURSE AND POSITION INDICATOR.
No. 442,925. Patented Dec. 16, 1890.
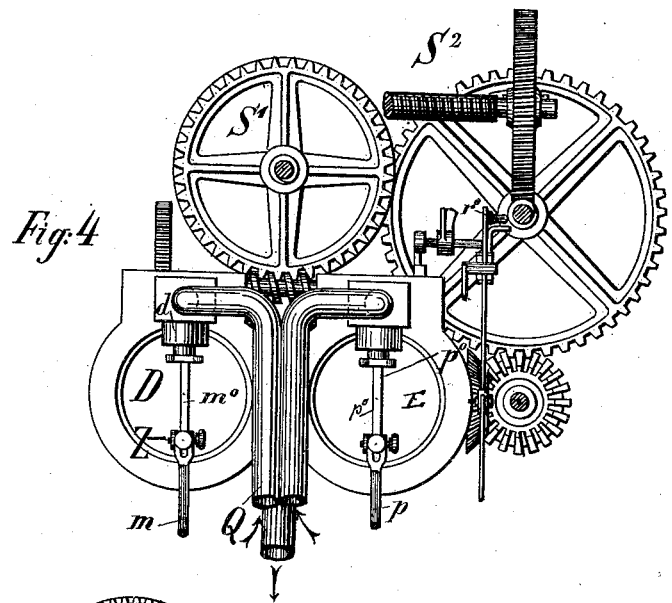
Fig. 4
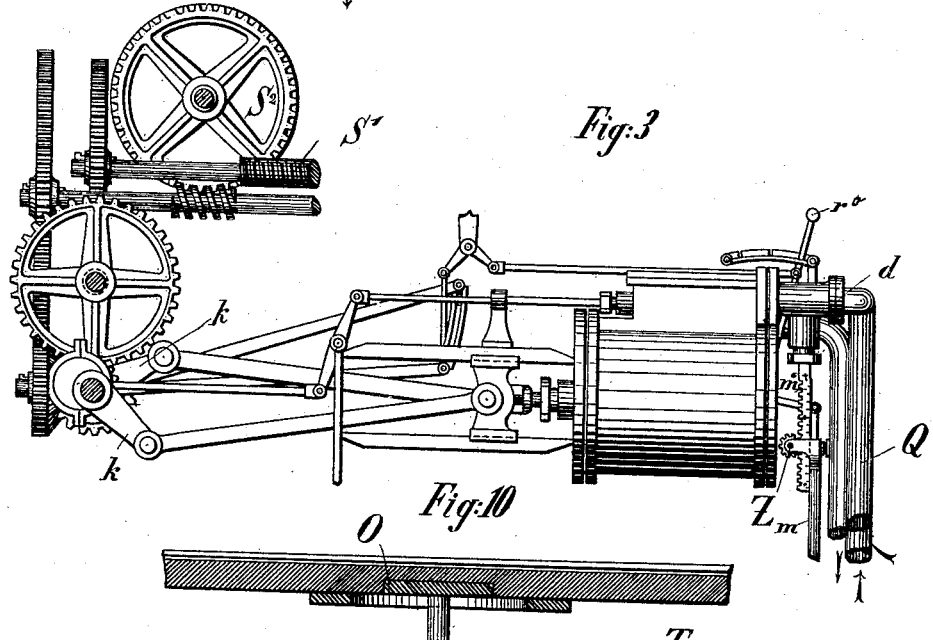
Fig. 3
Fig. 10
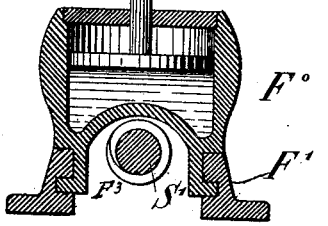
Witnesses:
Henry Huber
Martin Petry
Inventor:
Theophilus Tanner
Ernst Lutz
by Gospel & Raeginer
Attorneys (No Model.) 6 Sheets—Sheet 3.

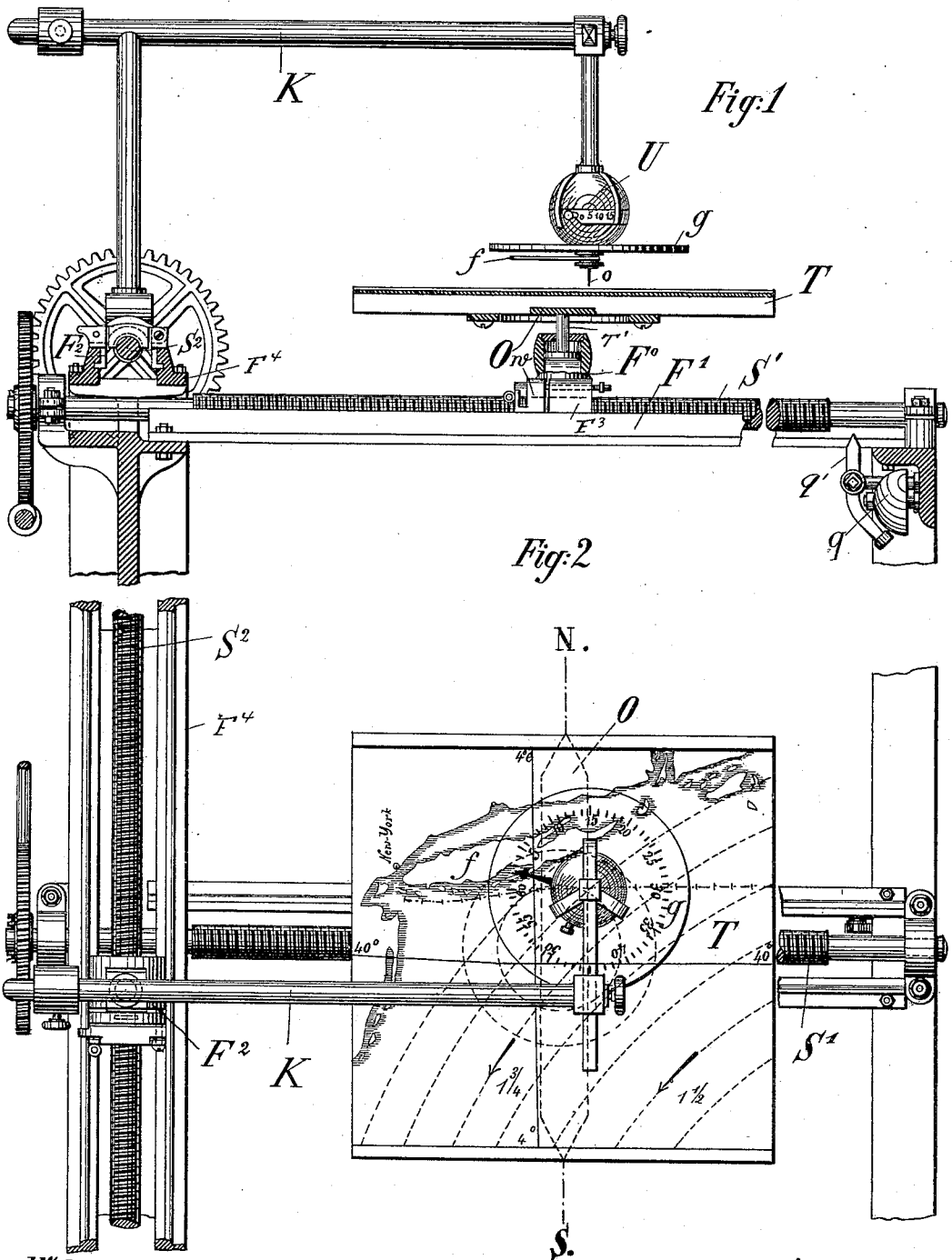

T. TANNER & E. LUTZ.
SHIP'S COURSE AND POSITION INDICATOR.

No. 442,925. Patented Dec. 16, 1890.

Witnesses:
Henry Huber
Martin Petry

Inventor:
Theophilus Tanner
Ernst Lutz
by Goepel & Raegener
Attorneys

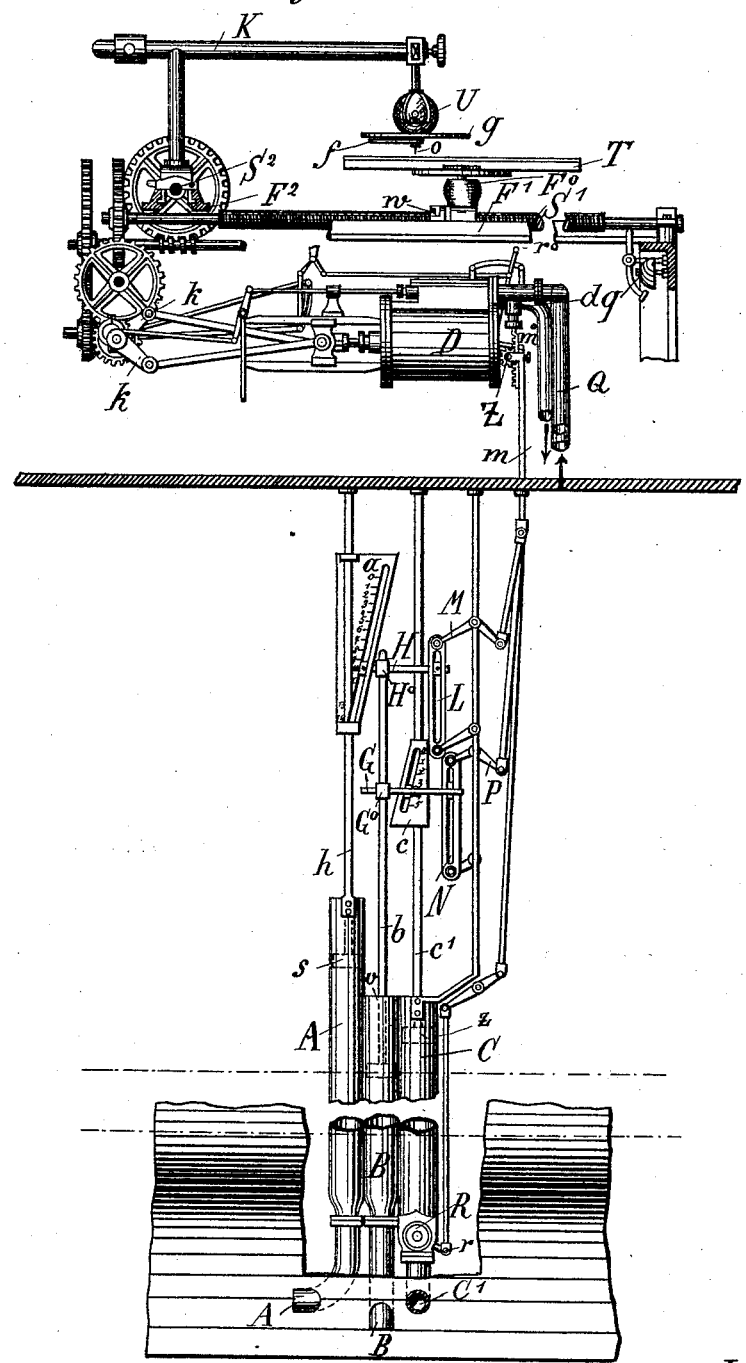

(No Model.) 6 Sheets—Sheet 5.
T. TANNER & E. LUTZ.
SHIP'S COURSE AND POSITION INDICATOR.
No. 442,925. Patented Dec. 16, 1890.
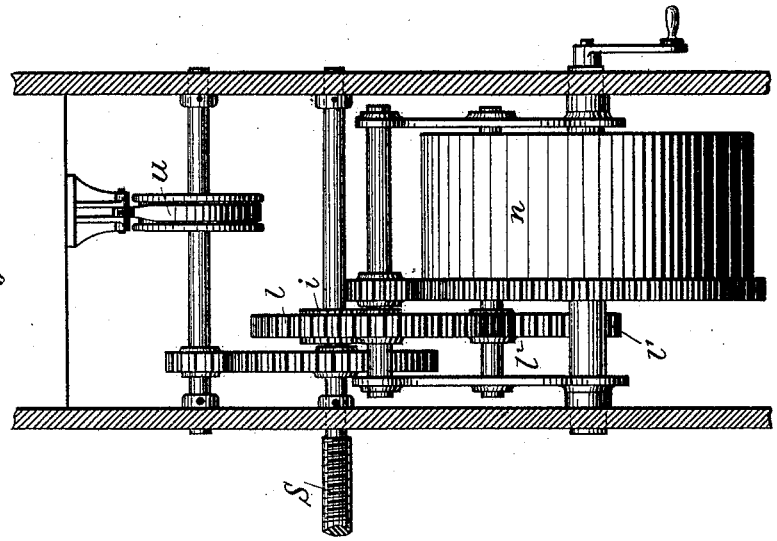
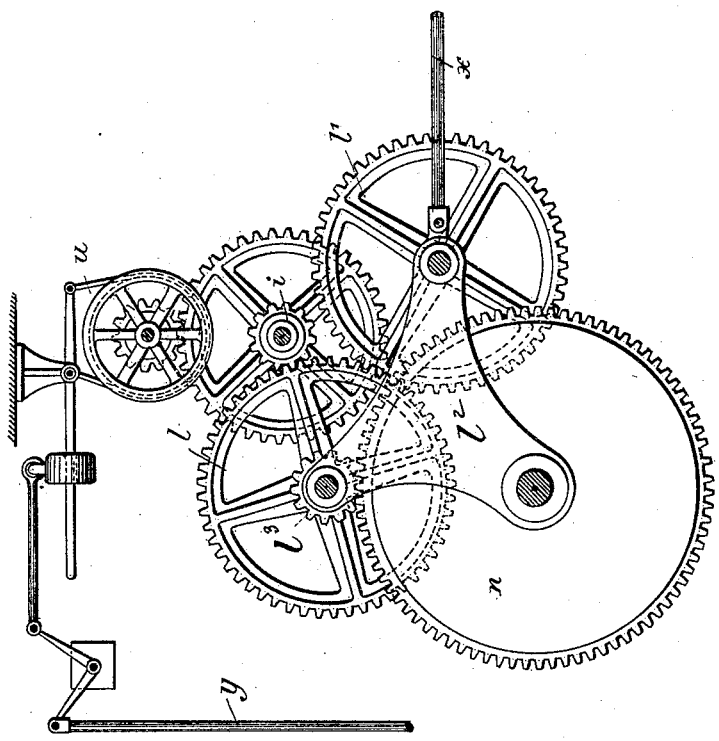
Witnesses:
Henry Huber
Martin Petry
Inventor:
Theophilus Tanner
Ernst Lutz
by Joepul & Raegener
Attorneys (No Model.) 6 Sheets—Sheet 6.
T. TANNER & E. LUTZ.
SHIP'S COURSE AND POSITION INDICATOR.
No. 442,925. Patented Dec. 16, 1890.
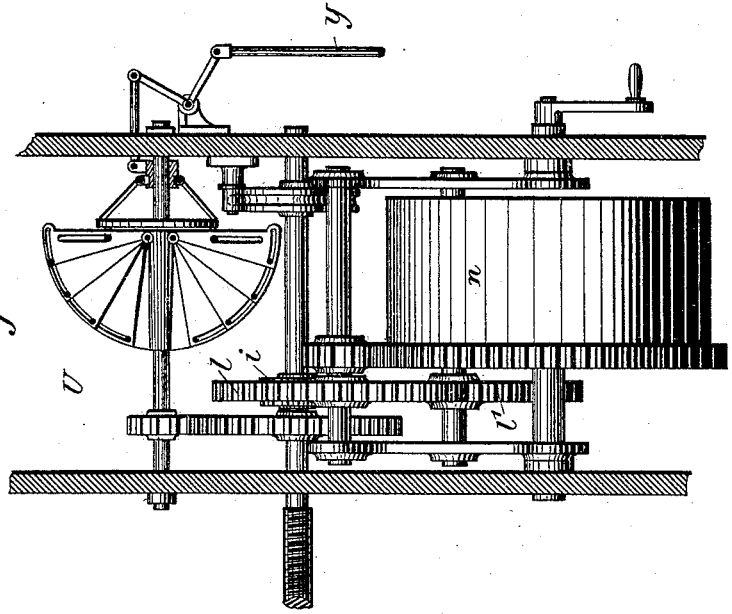
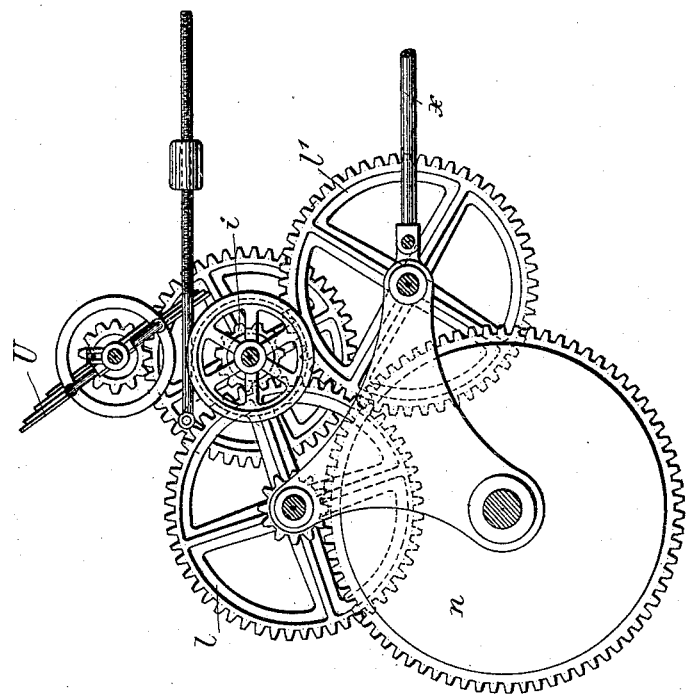
Witnesses:
Harry Harber
Martin Petry.
Inventor:
Theophilus Tanner
Ernst Lutz
by Goepel & Raegener
Attorneys

UNITED STATES PATENT OFFICE.

THEOPHILUS TANNER, OF PONTS-DE-MARTEL, AND ERNST LUTZ, OF ZURICH, SWITZERLAND.

SHIP'S COURSE AND POSITION INDICATOR.

SPECIFICATION forming part of Letters Patent No. 442,925, dated December 16, 1890.

Application filed December 11, 1889. Serial No. 333,381. (No model.)

*To all whom it may concern:*

Be it known that we, THEOPHILUS TANNER, a citizen of the United States of America, residing at Ponts-de-Martel, in Switzerland, and ERNST LUTZ, a citizen of the Republic of Switzerland, residing at Zurich, in Switzerland, have invented certain new and useful Improvements in a Ship Apparatus for Automatical Continual Indication of Geographical Place, Draft, and Velocity, of which the following is a specification.

The object of our invention is to provide a new and improved apparatus designed to trace the course of a vessel upon the sea upon a chart in such a manner that the course of the vessel is precisely and accurately produced on said chart and the position of the vessel clearly indicated at all times. Furthermore, the apparatus is designed to show at all times the speed and course of the vessel.

The invention consists in the construction and combination of parts and details, as will be fully described hereinafter, and finally pointed out in the claims.

Figure 6:
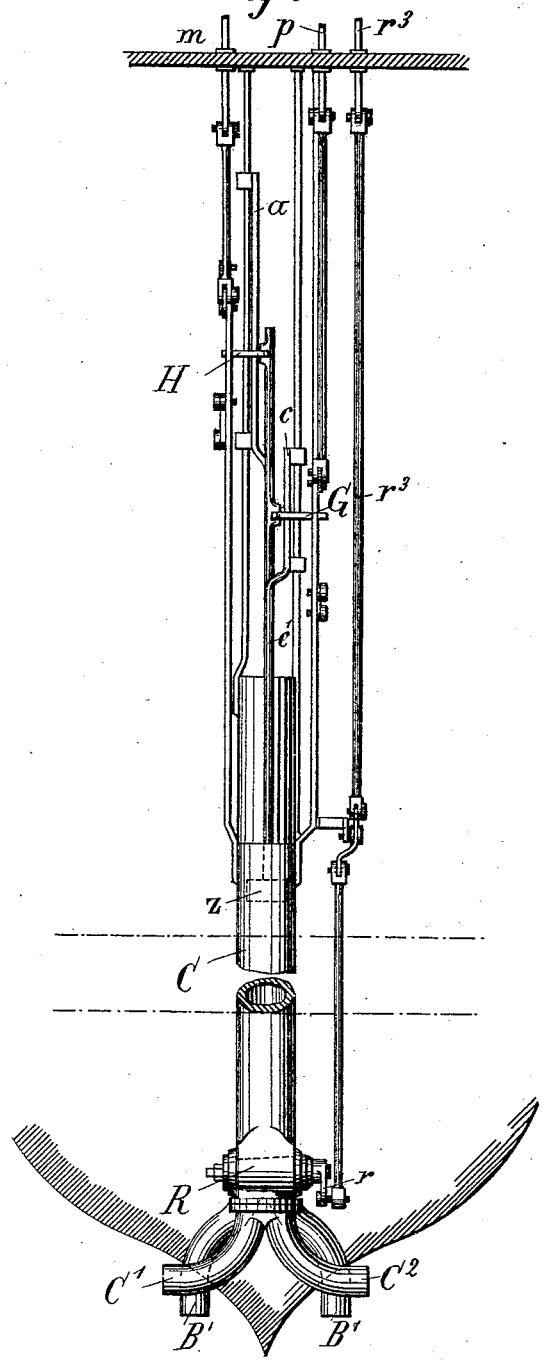
Figure 5:
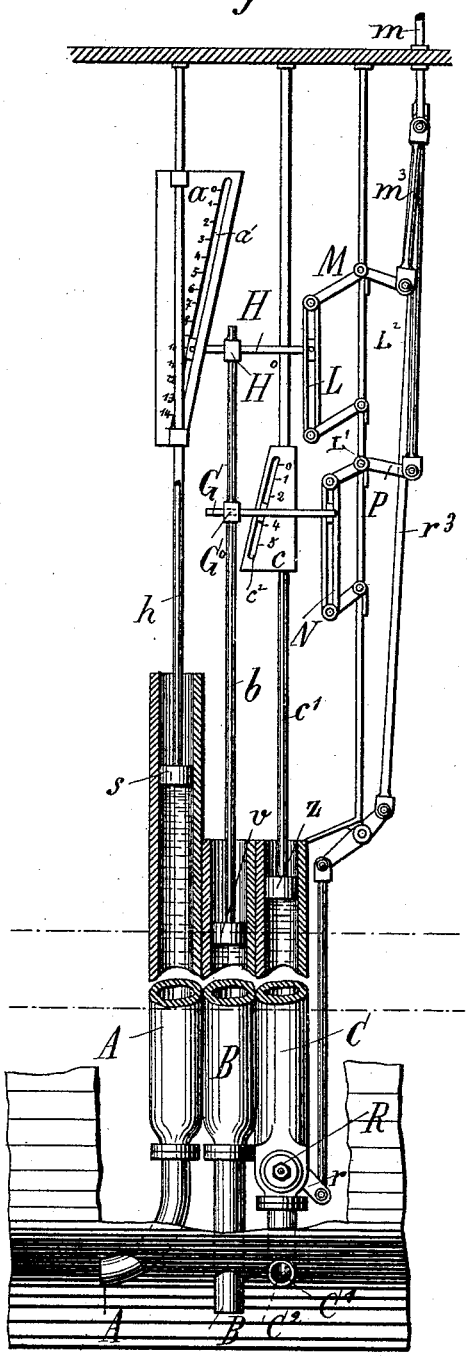

In the accompanying drawings, Figure 1 is a side view of the indicator of our improved ship's indicating apparatus, parts being shown in section and others broken out. Fig. 2 is a plan view of the indicator, parts being broken out and others in section. Fig. 3 is a side view of the motor and the gearing for transmitting motion, parts being broken out and others shown in section. Fig. 4 is an end view of the two motors, parts being broken out and others shown in section. Fig. 5 is a side view of the governor for controlling the motor or motors, parts being broken out and others shown in section. Fig. 6 is an end view of the same, taken transversely on Fig. 5, parts being broken out and others shown in section. Fig. 7 is a side elevation of the indicator, motor, and governor, parts being broken out and others shown in section. Fig. 8 is a side view of the spring-motor, which may be used for operating the mechanism. Fig. 9 is an end view of the same. Fig. $8^a$ is a side view of a modified construction of the spring-motor shown in Fig. 8. Fig. $9^a$ is an end view of the same, and Fig. 10 is an enlarged detail vertical sectional view of the support for the chart-table.

Similar letters of reference indicate corresponding parts.

The entire apparatus consists of an indicator, a motor, and a governor, which will now be described successively. The table T, adapted to support a chart suitably prepared and which will be described hereinafter, is accurately centered and balanced, so as to be easily rotated and so that the chart on the top of the table can always be adjusted to be in the proper position. Said table is provided with a downwardly-projecting stem T', provided on its lower end with a piston working in a socket $F^0$, fixed to a separable nut $F^3$, mounted to slide in a grooved guide F', arranged parallel with the longitudinal axis of the vessel. The nut $F^3$ is provided with a screw $w$, by means of which it can be closed or opened, as may be necessary. A screw-spindle S' passes through the opening of the nut $F^3$, and by turning said screw-spindle in one direction or the other the nut $F^3$, and with it the chart-table T, are moved forward or backward in the direction of the length of the vessel.

In the ball U, suitably suspended from a bracket-arm K above the chart-table T, a clock-work mechanism is placed, and from the bottom of said ball the arbor of the minute-hand $f$ projects downward, said minute-hand indicating the time by rotating over a glass dial-plate $g$, secured to the bottom of the ball and arranged above the chart-table T. A pin $o$ passes through the hollow minute-hand arbor and is actuated by means of any suitable well-known mechanism operated by the clock-work in the ball U, so as to make a downward stroke at regular intervals—say every five, ten, or fifteen minutes.

The bracket-arm K that supports the clock-work is supported by a nut $F^2$, adapted to slide in the guides $F^4$, arranged at right angles to the longitudinal axis of the vessel, and through said nut $F^2$ a screw-spindle $S^2$ passes. Said screw-spindle $S^2$ serves to move the ball U and the pointer relatively to the lateral deviation of the vessel, whereas the screw-spindle S' serves to move the chart-table T relatively to the forward and backward motion of the vessel, both spindles being controlled by suitable devices, which will be described hereinafter.

The position of the chart-table is controlled by means of a magnet O attached to its under side. When the chart-table in its motion has arrived at the end of its path and the vessel has traversed the course marked upon the chart, the nut $F^3$ strikes the hammer $q'$ of the gong $q$. The chart is then removed and replaced by the next following chart of the ship's course, and the pointer $o$ and chart are so adjusted that the pointer will be above the beginning of the course on said map-section.

It is considered advantageous to use a motor actuated by steam; but motors actuated by electricity, compressed air, explosive substances, spring-power, and heat may be used. Two motors are necessary, one for rotating the spindle $S'$ and the other for rotating the spindle $S^2$, which motors must be entirely independent of each other. The left-hand cylinder D, Fig. 4, serves to actuate the screw-spindle $S'$ for the chart-table and begins to work simultaneously with the first movement of the ship's propeller, as at that instant the controlling-valve $d$ of said motor is opened and the steam permitted to enter through the pipe Q into said cylinder. The passage of steam to said cylinder is proportioned to the speed of the vessel and is governed by the governor, which will be described hereinafter. The cylinder E rotates the spindle $S^2$ to the right or left, according as the deviation of the ship's course takes place to one side or the other, and thus the indicator-pin $o$ is moved correspondingly from the chart-table to the right or to the left. The transmission of motion from the cranks $k \, k$, operated by the cylinder, to the screw-spindle $S' \, S^2$ can be effected by any suitable mechanism.

In the apparatus shown in the drawings we have adopted a system of screw-wheels and screws, by means of which the number of revolutions of the cranks $k$, which is proportioned to the speed of the vessel, is reduced to correspond with the scale of the chart. For the vessels $m$ no steam is available. The spring-motor shown in Figs. $8^a$ and $9^a$ can be used. The drum $n$ is provided on its rim with a row of teeth, and is caused to rotate by the action of the spring contained in the same, in the same manner as in the clock, and by means of intermediate gearing of any suitable construction the shaft $S'$ is rotated. In order to admit of the rotating of said shaft in one direction or the other, the wheels $l$ and $l'$ are mounted on a rocking frame $l^2$, connected with the rod $x$, the cog-wheel $l$ carrying a pinion $l^3$, adapted to engage the teeth of the drum $n$. When the wheel $l$ is engaged with the pinion $i$, as shown in Fig. 8, the shaft $S'$ is rotated in one direction, and when the frame $l^2$ is shifted so that the wheel $l'$ is disengaged from the pinion $i$ and the motion is transmitted from the wheel $l$ to the wheel $l'$, and from the latter to the pinion $i$, the direction of rotation of the shaft $S'$ is reversed.

The rod $x$ is connected with the governor. A suitable braking device $u$ is operated by a rod $y$, also operated from the governor. The working of the apparatus is regulated by applying the brake a greater or less extent. This corresponds to the cutting off of the steam from the cylinders of the steam-motor. Instead of using a band-brake $u$, as shown in Figs. 8 and 9, an expansible fan-brake U may be used, as shown in Figs. $8^a$ and $9^a$, which fan-brake is operated in any suitable manner from the rod $y$.

The governor (shown in Figs. 5, 6, and 7) is based upon the principle of the "pilot's tube," in which the height to which the water ascends is proportionate to the speed with which the tube is moved forward in the water.

In our improved governor we use three tubes A, B, and C, and when the vessel is in a position of rest the height of the water in all three tubes corresponds to the draft of the vessel. The tube B is provided at its lower end with two downwardly-extending branch pipes $B' \, B'$, one at each side of the keel, and the height of water in the said tube remains the same during the entire passage—that is to say, it is not influenced by the speed of lateral movements of the vessel. In the tube B a float $v$ is placed, from which the rod $b$ projects downward. On said rod the two collars $G^0$ and $H^0$ are fixed, in which the rods G and H are mounted to slide at right angles to the said rod B.

A is a course-tube, and its lower end is bent forward at an angle of about ninety degrees and passes through the bottom of the vessel, as shown in Fig. 5. The height to which the water ascends in the tube A indicates the speed of the vessel. In said tube a float $s$ is provided, which has an upwardly-projecting rod $h$, at the upper end of which is fixed a wedge-shaped plate $a$, provided along its inclined edge with a slot $a'$, into which slot a pin or lug on one end of the sliding rod H passes. The wedge-shaped plate $a$ is moved up or down, according to the height of water in the pipe A—that is, according to the speed of the vessel. That end of the rod H opposite the one guided in the slot $a'$ slides in the slot of a bar L, the lower end of which is pivoted to a link $L'$, in turn pivoted to a frame $L^2$, and the upper end of the slotted bar L is hinged to one end of an angle-lever M, the opposite end of which is connected by the link $m^3$ with the rod $m$. As the rod $h$ moves upward, the slotted bar L is moved to the left, Fig. 5, whereby the rod $m$ is moved downward and the valve of the cylinder D opened to a greater extent to admit more steam, so that the spindle $S'$ will be rotated with greater speed. On the contrary, when the speed of the vessel decreases, the float $s$ descends, the plate $a$ is moved downward, the slotted bar L is moved to the right, and the rod $m$ moved upward, whereby the steam-valve of the cylinder D is closed to a greater extent, and thus the speed of the screw-spindle S' is decreased. The pipe C serves for governing the apparatus in regard to the lateral deviation, and for this purpose the lower end of the pipe C is provided with the two branch pipes C' C², projecting from opposite sides of the keel. The pipe C contains a float $z$, from which the rod $c'$ projects downward, said rod carrying the wedge-shaped plate $c$, having the inclined guide-slot $c^2$, into which a lug projects from the sliding rod G, said sliding rod also engaging a slotted bar N, connected with an angle-lever P, which in turn is connected by a suitable link with the rod $p$, Fig. 6, that governs the valve of the motor-cylinder E. Said float $z$ thus governs the speed of rotation of the shaft S² and the movements of the pin or marker $o$. Each of the wedge-shaped plates $a$ and $e$ is provided with a scale which gives the height of the ascending water in the pipes.

When the vessel is in the Gulf-stream, for instance, which increases or diminishes the resistance to be overcome by the vessel's engine, a suitable correction must be made in the movements of the parts. The direction and the velocity of the currents are indicated on the nautical chart by means of arrows and numbers. To permit of such adjustment, the rod $m$ is provided at its upper end with a pinion Z, engaging a rack $m^0$, connected with the valve-stem. When the sea is smooth, the upper end of the rod $m$ is at the zero-mark of the scale provided on the rod $m^0$, the mark $+$ toward the top and $-$ toward the bottom. When the vessel moves with the current, the speed will be increased by the motion or the speed of the current, and to adjust the device the toothed wheel $z$ is turned by hand until the upper end of the rod $m$ points on the plus scale to the number corresponding to the current and is then locked in place. If the current is a contrary one, the upper end of the rod $m$ is adjusted in a similar manner to the corresponding number of the minus scale of the rod $m^0$. A set-screw serves to hold the two parts $m^0$ and $m$ firmly together and in position when adjusted. The rod $p$ is connected in a similar manner with the rod $p^0$ of the link E, in case the ship passes transversely through the current, thus permitting of adjusting all the mechanism for moving the pin $o$ according to the currents through which the vessel passes.

Below the low-water line of the vessel the cock R is arranged in the pipe C, which cock is provided with two passages at right angles to each other, and which are usually kept half open. In case of wind, storm, or high sea from that side of the vessel from which the pipe C² projects, the vessel will be driven laterally in the direction toward the side from which the pipe C' projects. This deviation is shown upon the chart-table by the indicator, which is moved by means of the spindle S² in the direction of the said deviation and proportionate to the same. The reversing-lever $r^0$ of the motor for driving the spindle S² is then adjusted so as to give said spindle the direction of rotation corresponding to the lateral deviation of the vessel. The lever $r^0$ is connected with the rod $r^3$, which in turn is connected with the crank $r$ of the cock R, which is turned in the tube C, so that the branch tube C² is closed and the branch tube C' is opened. The water now rises proportionately to the speed of the deviation in the tube C and opens the valve in the cylinder E correspondingly. In case the vessel is driven laterally in the opposite direction the cock R is reversed, so that the branch tube C² is opened and the branch tube C' is closed. The movements of the vessel in lengthwise direction thus fully controls and moves the chart-table, whereas the lateral movements fully control the devices for supporting and moving the pin $o$.

Having thus described our invention, we claim as new and desire to secure by Letters Patent—

1. In an apparatus for indicating the situation of vessels at sea, the combination, with a pilot's tube, of a recording mechanism, a motor for operating said recording mechanism, and a float in the pilot's tube for controlling said motor, substantially as set forth.

2. In an apparatus for indicating the situation of vessels at sea, the combination, with a chart-table, of a motor for moving the same in the direction of the length of the vessel, an indicator mounted above the chart-table, a motor for operating the same transversely to the length of the vessel, and independent floats for controlling said motors, substantially as set forth.

3. In an apparatus for indicating the situation of vessels at sea, the combination, with a chart-table, of a magnet on the same, an endless screw for shifting said chart-table in the direction of the length of the vessel, a motor for operating said screw, an indicator mounted above the chart-table, a screw for moving said indicator at right angles to the direction of the length of the vessel, and independent floats to govern said screws, substantially as set forth.

4. In an apparatus for indicating the situation of vessels at sea, the combination, with a chart-table and a motor for moving the same, of an indicator above the chart-table and a motor for moving the same, pilot-tubes, floats in the pilot-tubes, wedge-shaped slotted plates carried by said floats, and sliding rods operated by an additional float in an additional pilot-tube, which sliding rods govern the controlling mechanism of the motor, substantially as set forth.

5. In an apparatus for indicating the situation of vessels at sea, the combination, with a chart-table, and a motor for moving the same, of an indicating mechanism above the chart-table and a motor for moving the same, the pilot-tubes A, B, and C, floats in the same, rods connected with said floats, the wedge-shaped plates $a\ c$, having inclined slots and secured to the rods of the floats in the pilot-tubes A C, the rod $b$ on the float in the pilot-tube B, sliding rods G and H on said rod, and slotted bars L and N, actuated by the rods G and H, substantially as set forth.

6. In an apparatus for indicating the situation of vessels at sea, the combination, with an indicating device and a motor for operating the same, of the rack-rod $m^0$, connected with the valve of the motor, the rod $m$, operated from a float, the pinion $z$, and a thumb-screw for locking the rods $m\ m^0$ together, substantially as set forth.

7. In an apparatus for indicating the situation of vessels at sea, the combination, with a recording and indicating device, of a motor for operating the same, an extensible valve-rod governing the valve of said motor, and a float operating the valve-rod, substantially as set forth.

8. In an apparatus for indicating the situation of vessels at sea, the combination, with an indicating and recording mechanism, of a motor, a pilot-tube containing a float, a rod operated from said float and serving to control the motor, and a cock in said pilot-tube, which cock is connected with the reversing mechanism of the motor, substantially as set forth.

9. In an apparatus for indicating the situation of vessels at sea, the combination, with a screw, of a nut on the same, a guide for said nut, and a cup on said nut, a chart-table, and stem on the bottom of said table fitting in the cup, substantially as set forth.

10. In an apparatus for indicating the situation of vessels, the combination, with a movable chart-table and mechanism for moving the same, of an indicator located above the chart-table, a clock-work for operating said indicator, a dial-plate suspended from the clock-work, a hand mounted to rotate over the dial-plate, and mechanism for shifting said indicator and its mechanism, substantially as set forth.

11. In an apparatus for indicating the situation of vessels, the combination, with a chart-table, of a motor for moving said chart-table in the direction of the length of the vessel, a float for controlling said motor, an independent pilot-tube having its lower end projected in the direction toward the front of the vessel and containing said float, an indicator mounted to move over the chart-table transversely to the longitudinal axis of the vessel, a motor for moving said indicating device, a float for controlling said motor, and a pilot-tube containing said float, which pilot-tube is provided at its lower end with branches projecting from the vessel at opposite sides of the keel, substantially as set forth.

In testimony whereof we hereunto sign our names, in the presence of two subscribing witnesses, this 14th day of June, 1889.

THEOPHILUS TANNER.
ERNST LUTZ.

Witnesses:
  EMIL BLUM,
  MORITZ VEITH.